United States Patent
Lerner et al.

(10) Patent No.: US 9,146,885 B2
(45) Date of Patent: Sep. 29, 2015

(54) PARALLEL ATOMIC INCREMENT

(71) Applicant: ANALOG DEVICES, INC., Norwood, MA (US)

(72) Inventors: Boris Lerner, Sharon, MA (US); John L. Redford, Arlington, MA (US)

(73) Assignee: Analog Devices, Inc., Norwood, MA (US)

( * ) Notice: Subject to any disclaimer, the term of this patent is extended or adjusted under 35 U.S.C. 154(b) by 316 days.

(21) Appl. No.: 13/896,588

(22) Filed: May 17, 2013

(65) Prior Publication Data

US 2014/0344545 A1    Nov. 20, 2014

(51) Int. Cl.
G06F 12/00 (2006.01)
G06F 13/16 (2006.01)
G06F 9/52 (2006.01)

(52) U.S. Cl.
CPC ............. *G06F 13/1657* (2013.01); *G06F 9/52* (2013.01); *G06F 13/1663* (2013.01)

(58) Field of Classification Search
CPC ............................... G06F 9/52; G06F 13/1663
See application file for complete search history.

(56) References Cited

U.S. PATENT DOCUMENTS

| 8,375,176 | B2  |    2/2013 | Coon et al.       |
|-----------|-----|-----------|-------------------|
| 2009/0276606 | A1 | 11/2009 | Mimar             |
| 2011/0225376 | A1* | 9/2011 | Hasting et al. ................ 711/154 |
| 2012/0290816 | A1 | 11/2012 | Eichenberger et al. |

* cited by examiner

*Primary Examiner* — John Lane
(74) *Attorney, Agent, or Firm* — Patent Capital Group (57) ABSTRACT

Certain example embodiments of the present disclosure can provide a parallelized atomic increment. A vgather instruction returns to a plurality of processing elements the value of a memory location. A vgather_hit instruction returns to a function of the number of "hits" to the memory location. In one embodiment, the function is unity. In another embodiment, the function is the number of hits having an ordinal designation less than or equal to the processing element receiving the return value.

23 Claims, 6 Drawing Sheets

PARALLEL ATOMIC INCREMENT

TECHNICAL FIELD

This specification relates to the field of parallel processing, and more particularly to a microprocessor providing a parallel atomic increment capability.

BACKGROUND

Parallel processing, for example that is implemented by a digital signal processor (DSP) to optimize digital signal processing algorithms, tends to be intensive in memory access operations. For example, a DSP can operate as a single instruction, multiple data (SIMD), or data parallel, processor. In SIMD operations, a single instruction is sent to a number of processing elements of the digital signal processor, where each processing element can perform a same operation on different data. To achieve high-data throughput, memory organization of DSPs having SIMD architectures (or other processor supporting parallel processing) support multiple, synchronous data accesses. In an example, a processor architecture may include a multi-banked memory interconnected by a memory interconnect network architecture to the processing elements, such that more than one data operand can be loaded for (accessed by) the processing elements during a given cycle.

The memory interconnect network architecture typically includes an interconnection network for every respective parallel data transfer. For example, if two parallel data transfers from the memory to the processing elements are needed to perform an operation, the memory interconnect network architecture implements an interconnection network for transferring a first data set from the memory to the processing elements and another interconnection network for transferring a second data set from the memory to the processing elements.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only.

OVERVIEW OF EXAMPLE EMBODIMENTS

In one example embodiment, there is disclosed computer-executable method comprising: receiving a plurality of simultaneous read requests for a memory location; returning the value of the memory location and the value of a function of the number of simultaneous read requests; computing a sum of the value of the memory location and the number of read requests; and writing the sum back to the memory location.

In another example embodiment, there is disclosed a microprocessor comprising a plurality of processing elements configured to simultaneously access a memory location, wherein the microprocessor is configured, upon receiving a plurality of read requests for the memory location, to return to at least one of the processing elements a value contained in the memory location and a value of a function of the number of processing elements that accessed the memory location.

In yet another exemplary embodiment, there is disclosed a microprocessor providing a vector hit instruction, the vector hit instruction configured to receive within a first time division and from a plurality of processing elements a plurality of read requests directed to a memory location; and on a second time division return to at least one of the processing elements a value that is a function of the number of processing elements that provided read requests for the memory location during the first time division.

DETAILED DESCRIPTION OF EXAMPLE EMBODIMENTS

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Atomic increment is an operation often provided by certain classes of parallelized microprocessors such as graphics processing units (GPUs) and digital signal processors (DSPs), and is provided as a native method in the programming language OpenCL. Atomic increment guarantees that if multiple threads perform the same operation on a memory location, the result is consistent. For example, assuming that two threads called "process A" and "process B" are both operating on a data set to create a histogram, both may find a "hit" for a certain value and access the memory location where the count for that value is stored, for example hexadecimal location 0x100. Assuming that location 0x100 contains the value "0," process A may read the value 0 from 0x100 and load it into a register. On the next clock cycle, process A increments the value to "1," but process B may also read a "0" from 0x100 while process A is incrementing. Process A then writes "1" to 0x100, and finally process B writes "1" to 0x00.

The result is incorrect. Because two threads each found a hit for the value, the correct incremented value should be "2." So an atomic increment operation is provided to guarantee that if two threads access the memory location, the correct value of "2" will be written. A generalized prototype of the atomic increment function may be of the form:

int atomic_inc(int*p)

Atomic increment accepts a pointer to a memory location, locks the location pointed to, increments the value pointed to, and returns the old value pointed to. Thus, in the previous example, both threads may call:

old=atomic_inc(0x100);

When process A calls atomic_inc, a lock is placed on memory location 0x100. When process B tries to read location 0x100 while the lock is in place, it will be required to wait until process A has finished the increment operation. Process A increments the value to "1," and receives "0" (the old value) as a return. Process B is then permitted to access the memory location, increments the value to "2," and receives "1" as a return value.

An atomic operation relying on lock states will inherently cause otherwise parallel processes to linearize. For example, process A and process B may be operating on separate chunks of a single data set. Both may simultaneously locate a hit for a particular value and want to update the histogram entry for that value. But because process A places a lock on the memory location, process B will be forced to wait as though the increment were a serial operation.

A parallelized version of an atomic increment operation, however, permits both process A and process B to correctly increment the memory location in parallel. For example, a single-instruction multiple-data (SIMD) microprocessor may provide a plurality of processing elements (PEs), each working on separate chunks from a data set to form a histogram. If three PEs locate an identical value at substantially the same time, each will simultaneously issue a read request to 0x100 via a special "vgather" instruction. In response to the vgather instruction, each PE receives the old value in a first register and the number of PEs that accessed the memory location in a second register. Those with skill in the art will also recognize that this method can be trivially altered by returning a simple, reversible function of either value, for example, offset by a constant or a multiplier. For purposes of this specification, any trivial reversible function of a return value is treated as the exact equivalent of the return value itself.

Thus, after executing the "vgather" instruction, each PE knows the old value and knows that three PEs accessed the value. Instead of incrementing the old value by one, each PE instead increments the value by three. The PEs then each issue a write request to the memory location, and the correct value is stored.

A more generalized version of this instruction may also or alternatively be provided, and is more useful for certain compression operations. In that case, PEs are prioritized by an ordinal designation. For example, if a microprocessor contains eight PEs, they will be numbered 0-7. In this version of the "vgather" instruction, each processor receives a function of the number of PEs that issued a read request, specifically in this exemplary embodiment, the number of PEs with a designation less than or equal to the PE issuing the request. So for example, PEs 0, 1, and 3 may each issue a vgather instruction for location 0x100 on the same clock cycle. Each receives "0" as the old value of 0x100. PE0 receives "1" as the return value for the number of PEs because it is the only PE with its designation or lower that issued a read request to 0x100. PE1 receives "2" as the return value for the number of PEs because PE1 and PE0 have a designation less than or equal to PE1. PE 3 receives "3" as the return value for the number of PEs because PE3, PE1, and PE0 all have a designation less than or equal to PE3.

On the next clock cycle, PE3, PE1, and PE0 all attempt to write a value back to 0x100, creating a race condition. The microprocessor provides rules to arbitrate which value is permitted to write. For example, in this embodiment, the PE with the highest designation may be permitted to write back, in this case PE3, which has correctly incremented the count by 3. So after this clock cycle, PE3 has the value "3," which is written back to 0x100. That location now correctly reflects that three new occurrences have been located.

Additional details of an exemplary embodiment are best understood with reference to the attached figures. It should be understood, however, that the attached figures provide only one or more exemplary embodiments, and that those with skill in the art will appreciate and recognize many suitable variations on the disclosed embodiments are possible, and it is not intended for the claims to be limited to the specific embodiments disclosed.

Figure 1:
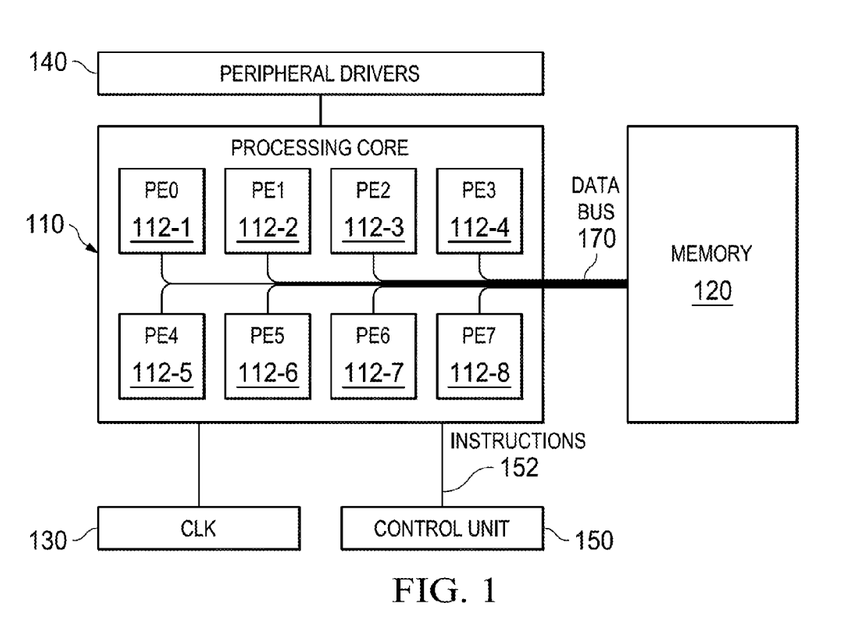
FIG. 1 is a block diagram of a digital signal processor configured to provide a parallel atomic increment instruction.

FIG. 1 is a block diagram of an exemplary embodiment of a digital signal processor (DSP) 100. DSP 100 includes a processing core 110, which includes a plurality of processing elements 112. Each processing element is indexed with an ordinal designation, in this case from 0 to 7, so that PE 112-1 is designated as PE0, PE 112-2 is designated as PE1, and so on up to PE 112-8, which is designated as PE7. Although this example discloses a DSP 100 with eight processing elements, those with skill in the art will recognize that the number of PEs is an ordinary design choice, and that for purposes of this disclosure, DSP 100 may have any number of PEs that provide substantially parallel operation. PEs 112 may perform numeric processing for digital signal processing algorithms, and may operate independently, in parallel, or as a SIMD engine. PEs 112 may be vector processors, as in this exemplary embodiment, or may be any combination of scalar and vector processors.

Those with skill in the art will also recognize that although DSP 100 is disclosed as a "digital signal processor," this is only one example of many different types of microprocessors that could be adapted for use with the present disclosure. For example, DSP 100 may, in other examples be a central processing unit, microcontroller, graphics processing unit, field-programmable gate array or application-specific integrated circuit by way of non-limiting example.

DSP 100 is communicatively coupled to a memory 120 via a data bus 170. Memory 120 may be for example a random-access memory or non-volatile memory. Memory 120 is a logical designation, and those with skill in the art will recognize that memory 120 may be divided into one or more layers of on-core cache, main memory, paging, and non-volatile memory. In some embodiments where processing speed is critical, memory 120 may be a high-speed, low-latency memory technology.

A control unit 150 is communicatively coupled to processing core 110 and may decode and provide software instructions 152. In some embodiments, instructions 152 comprise a signal that selectively activates a circuit on a PE 112. One exemplary SIMD method includes providing a single instruction to a plurality of PEs 112, with each PE operating on separate memory locations. This should not be confused, however, with operating on separate histogram arrays. For example, given a four-tone image, eight separate PEs 112 may operate on eight separate regions of the image, each looking for occurrences of the four tones. Each PE 112 updates a single histogram array with four positions. The histogram is applicable to the entire image, so all eight PEs 112 should be able to access and update the histogram.

A clock 130 regulates timing for DSP 100. Clock 130 may control not only execution of instructions 152, but also access times to memory 120. A "clock cycle" is generally used to refer to a time encompassing a single cycle of a regular, alternating low-high cycle of clock 130. In some cases, PEs 112 are configured to execute a single instruction 152 during each clock cycle. But those having skill in the art will recognize that some instructions will take multiple clock cycles to execute, and that execution of a list of instructions can more generally be divided into a series of time divisions, and that each time division need not necessarily be equal in time to every or any other time division.

Because a plurality of PEs 112 may attempt to read from or write to the same memory location in a single time division, control unit 150 may need to arbitrate between PEs 112. For example, if PEs 112-1, 112-4, and 112-8 each try to write to the same memory location during a single time division, control unit 150 may permit only one value to be written out to memory 120 and discard the others. For example, control unit 150 may accept the value from the highest-numbered PE, in this case PE7 112-8. Other algorithms for arbitrating between multiple write requests are known in the art. In contrast, multiple read requests do not necessarily cause a data collision. In the case of multiple read requests, control unit 150 may merely fetch the requested value from memory 120 and provide it to each PE 112 that requested the value. It is inherent to these operations that control unit 150 knows the identity of each PE 112 attempting to access memory 120, and knows in aggregate how many PEs 112 have attempted to access the same memory location in a single time division.

Finally, processing core 110 may communicatively couple to one or more peripheral drivers 140, which enables processing core 110 to communicate with other system elements such as communication networks or human interfaces by way of non-limiting example.

Figure 2:
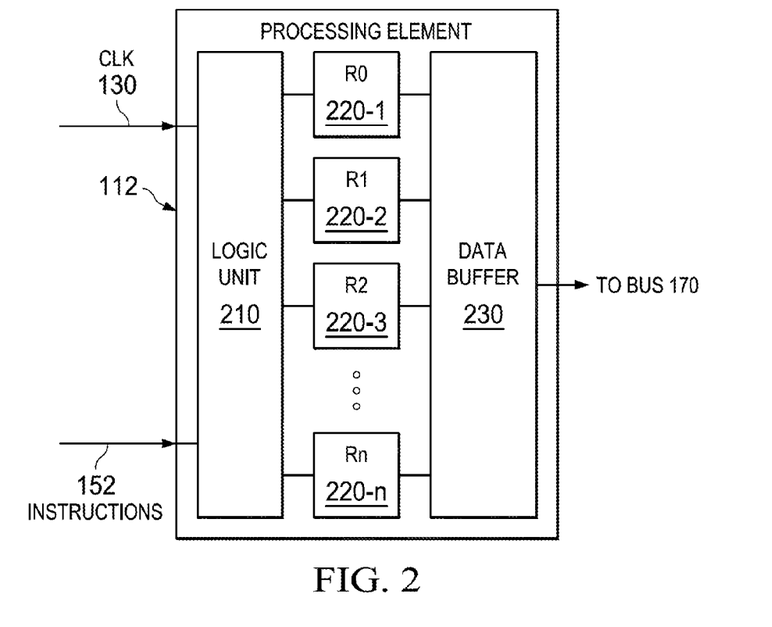
FIG. 2 is a block diagram of a processing element for a digital signal processor.

FIG. 2 is a block diagram of an exemplary embodiment of a processing element 112. PE 112 receives clock 130 and instructions 152 as described in FIG. 1. PE 112 also communicatively couples with bus 170, which enables PE 112 to request read or write access to a memory location. Although this exemplary embodiment shows a direct connection to bus 170, those with skill in the art will recognize that in some cases, control unit 150 (FIG. 1) or other selection circuitry may intercede between a single PE 112 and memory 120.

PE 112 includes a logic unit 210, which may include circuitry for carrying out one or more instructions. When an instruction 152 is provided to logic unit 210, instruction 152 may include data for selecting which instruction circuit to execute. Instructions may rely on one or more registers 220, which store temporary values for immediate access by logic unit 210. In general, a register 220 may be supplied with a value from memory 120 (FIG. 1) or by logic unit 210. When register values are retrieved from memory 120 (FIG. 1), data buffer 230 may be used to temporarily buffer values until a read or write request is complete.

Figure 3:
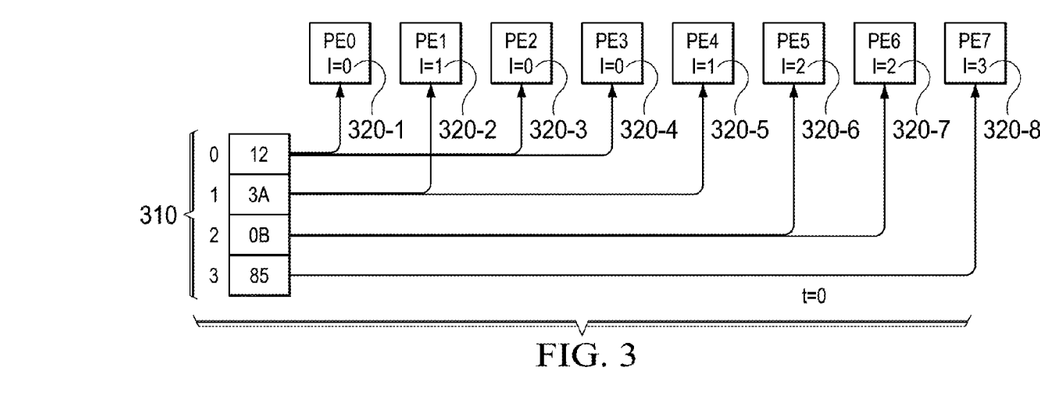
FIG. 3 is a block diagram illustrating a first state of a microprocessor executing a parallel atomic increment instruction.

FIG. 3 is a block diagram illustrating an exemplary method of implementing a parallel atomic increment. In the exemplary embodiment, a plurality of PEs 112 contain index values. For example, the exemplary method may be concerned with creating a histogram of a four-tone picture. In this case, a histogram of the four tones is stored in array 310, which is contained in memory 120 (FIG. 1). Array 310 includes four memory locations indexed 0 through 3, representing the four tones. At time t=0, some pixel processing has already occurred, so array[0] contains the hexadecimal value 0x12, meaning that before t=0, 0x12 pixels with that value were found. Similarly, array[1] contains 0x3A, array[2] contains 0x0B, and array[4] contains 0x85. Also previous to t=0, DSP 100 (FIG. 1) scanned eight more pixels of the image, finding that three were of intensity 0 (these values were received by PE0 112-1, PE2 112-3, and PE3 112-4). Two were of intensity 1 (PE1 112-2 and PE4 112-5), two were of intensity 2 (PE5 112-6 and PE6 112-7), and one was of intensity 3 (PE7 112-8). Each PE 112 holds its index value 320 in an index register I. At t=0, each PE 112 issues an instruction such as the exemplary "vgather" instruction, which issues a read request to memory 120 (FIG. 1), asking for the value of array[I].

Figure 4:
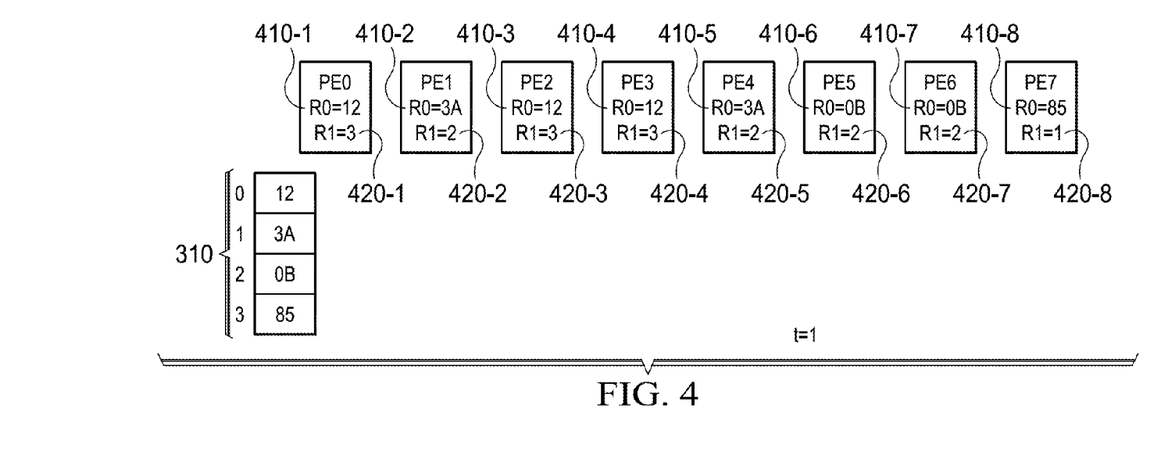
FIG. 4 is a block diagram illustrating another state of a microprocessor executing a parallel atomic increment instruction.

Turning to FIG. 4, a t=1, each PE 112 receives a return value from the vgather instruction. Each PE 112 includes two general-purpose registers R0 410 and R1 420. Each PE 112 receives in R0 410 the old value of array[I], and receives in R1 a value of a function of the number of PEs 112 that accessed array[I] during t=0. In this exemplary embodiment, the function is unity, so each PE 112 receives the value of the total number of PEs 112 that accessed array[I]. PE0 112-1, PE2 112-3, and PE3 112-4 each receive 0x12 into R0 410 and 0x3 into R1 420. PE1 112-2 and PE4 112-5 both receive the value 0x3A into R0 410 and 0x2 into R1 420. PE5 112-6 and PE6 112-7 both receive the value 0x0B into R0 410 and the value 0x2 into R1 420. PE7 112-8 receives the value 0x85 into R0 410 and 0x1 into R1 420.

Figure 5:
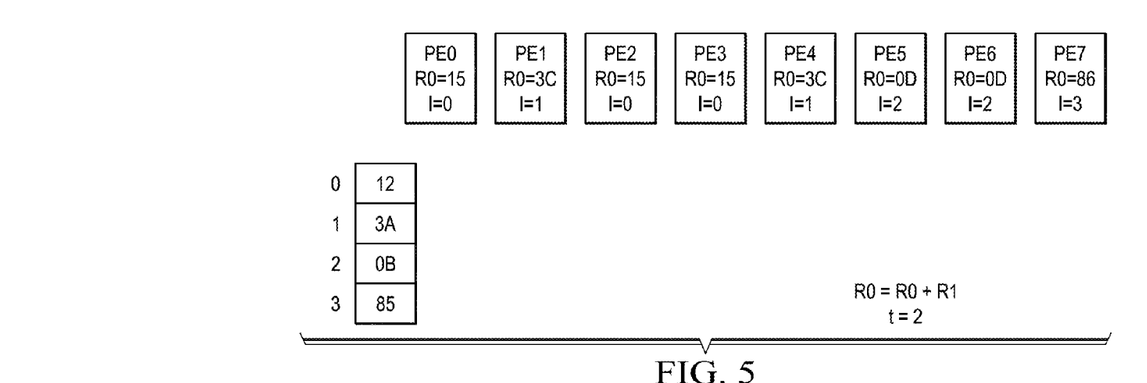
FIG. 5 is a block diagram illustrating yet another state of a microprocessor executing a parallel atomic increment instruction.

Thus, at time t=1, each PE 112 knows the old value of array[I], representing the number of pixels of that intensity previously encountered, and the number of PEs 112 that issued a read request to array[I], representing the number of pixels of that intensity encountered in this pass. At time t=2, to update the histogram, each PE 112 executes the SIMD instruction R0=R0+R1, as seen in FIG. 5. Each PE 112 now holds in R0 410 an accurate "hit" count for pixels of intensity "1." Each PE 112 also still holds in index register 320 the index for the memory location containing the count of pixels of intensity "I."

Figure 6:
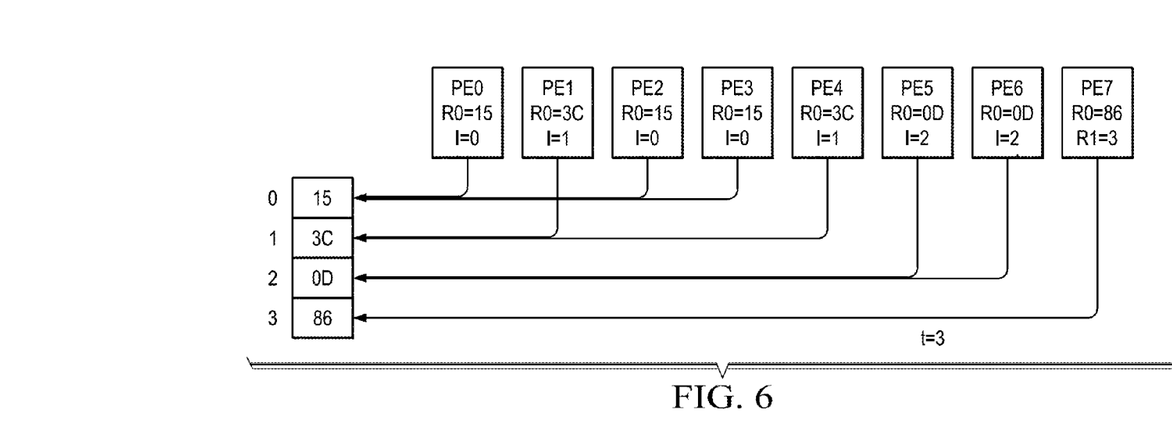
FIG. 6 is a block diagram illustrating yet another state of a microprocessor executing a parallel atomic increment instruction.

In FIG. 6, at time t–3 each PE 112 issues a write request to write back to array[I] the value it holds in R0, which is the updated hit count for the histogram. Because more than one PE 112 may be attempting to write to array[I], controller 150 may provide arbitration. For example, the PE 112 with the highest designation may be granted write access, so that in this case, PE3 112-4, PE4 112-5, PE6 112-7, and PE7 112-8 will each be granted write access to their respective memory locations.

Figure 7:
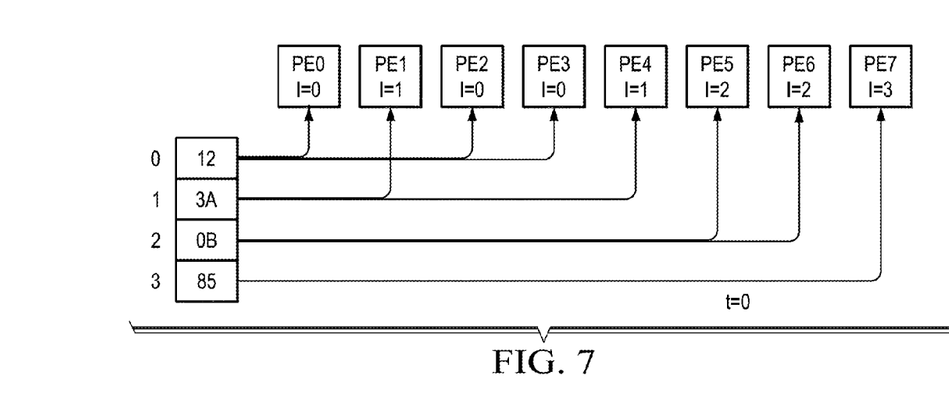
FIG. 7 is a block diagram illustrating yet another state of a microprocessor executing a parallel atomic increment instruction.

FIG. 7 is a block diagram illustrating a second exemplary embodiment in which a "vgather_hit" instruction is provided. In this case, FIG. 7 shows a plurality of read requests from a plurality of PEs 112 to array 310 at time t=0. As in FIG. 3, each PE 112 includes an index register 320. For simplicity of illustration, each PE 112 of FIG. 7 and each location in array 310 contain identical data to those shown in FIG. 3.

Figure 8:
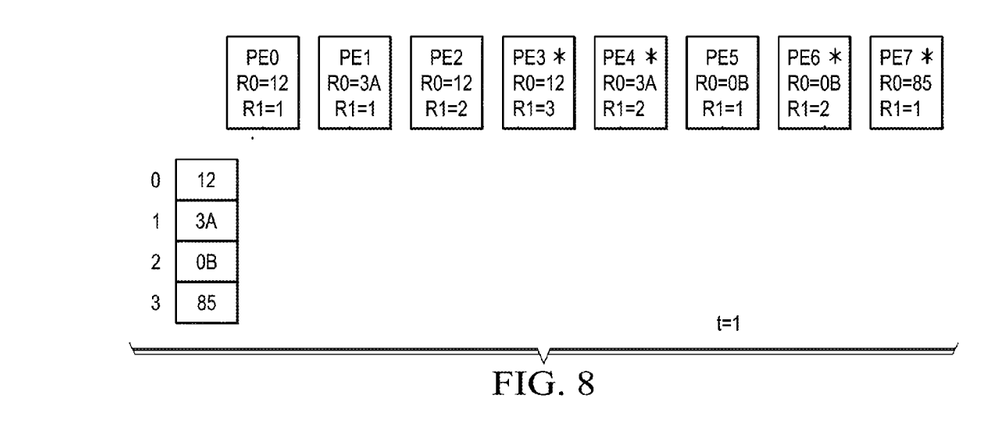
FIG. 8 is a block diagram illustrating yet another state of a microprocessor executing a parallel atomic increment instruction.

In FIG. 8, at time t=1, rather than returning the total number of PEs 112 that issued a read request, vgather_hit returns a function of the number of PEs 112 that issued a read request to that memory location. Specifically, each PE receives in register R0 a count of PEs with a designation less than or equal to that of the PE. Thus, PE0, PE2, and PE3 each receive "0x0" into R1. PE0 receives "0x1" into R0, PE2 receives "0x2" into R0, and PE3 receives "0x3" into R0. Similarly, PE1 and PE4 both receive "0x1" into R1. PE1 receives "0x1" into R0 and PE4 receives "0x2" into R0. PE5 and PE6 both receive "0x2" into R1. PE5 receives "0x1" into R0 and PE6 receives "0x2" into R0. PE7 receives "0x3" into R1 and "0x1" into R0. Notably, while this embodiment of vgather_hit also returns the old value of the memory location into R0, this behavior is not necessary. In some applications, the only value of interest is the function of the hit count provided in R1 in this embodiment, and so that may be the only value provided.

Figure 9:
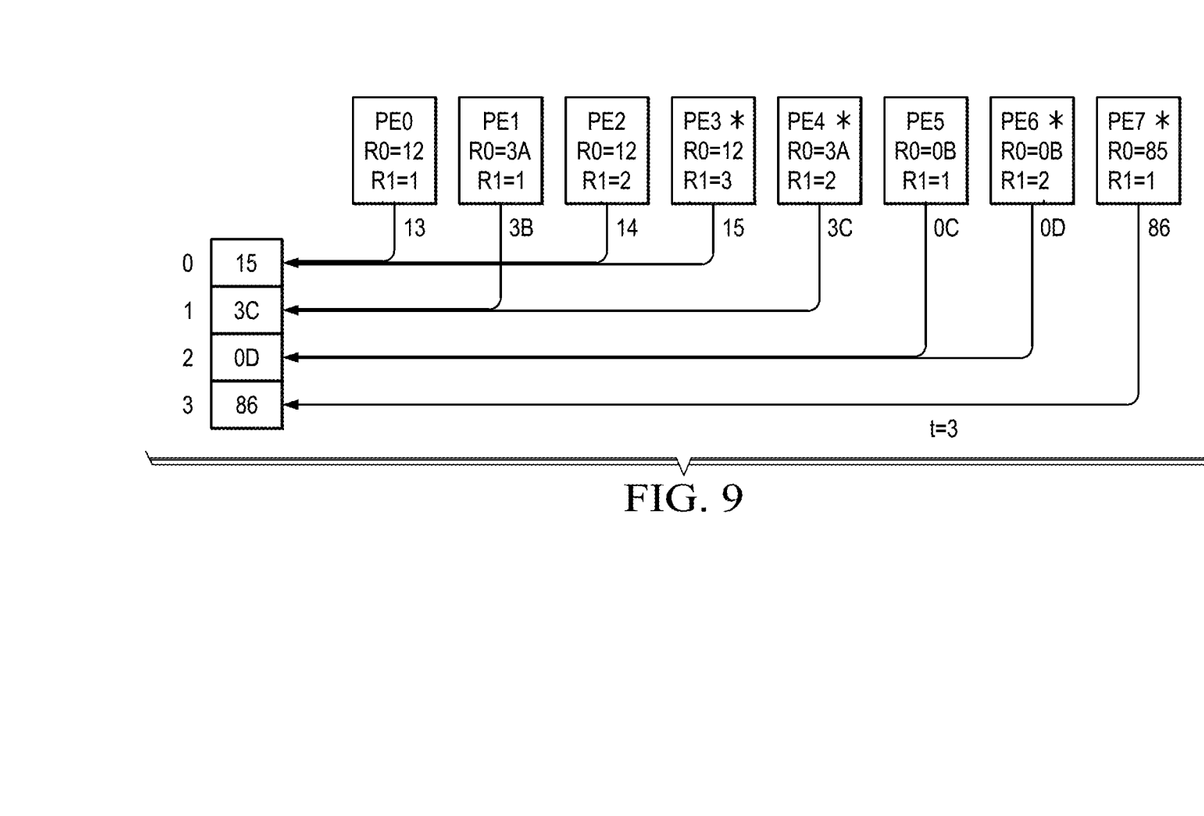
FIG. 9 is a block diagram illustrating yet another state of a microprocessor executing a parallel atomic increment instruction.

In FIG. 9, each PE 112 performs the vector sum operation R0=R0+R1, after which PE0 contains "0x13" in R0, PE1 contains "0x3B," PE2 contains "0x14," PE3 contains "0x15," PE4 contains "0x3C," PE5 contains "0x0C," PE6 contains "0x0D," and PE7 contains "0x86."

At t=3, Each PE 112 then attempts to write back its value to the location pointed to by its index register 320. In this case, PE0 112-1, PE2 112-3, and PE3 112-4 each try to write to memory location 0. Controller 150 provides arbitration, for example by accepting the write value from the PE 112 with the highest ordinal designation, in this case PE3 112-4. Thus, array[0] receives 0x15. Those with skill in the art, however, will recognize that other arbitration methods are available, and may be used as appropriate.

Similarly, PE1 and PE4 both attempt to write to array[1], and PE4 wins, so that array[1] receives 0x3C. PE5 and PE6 both attempt to write to array[2], and PE 6 wins, so that array[2] receives 0x0B. PE7 is the only PE 112 that writes to array[3], so no arbitration is necessary in that case.

Figure 10:
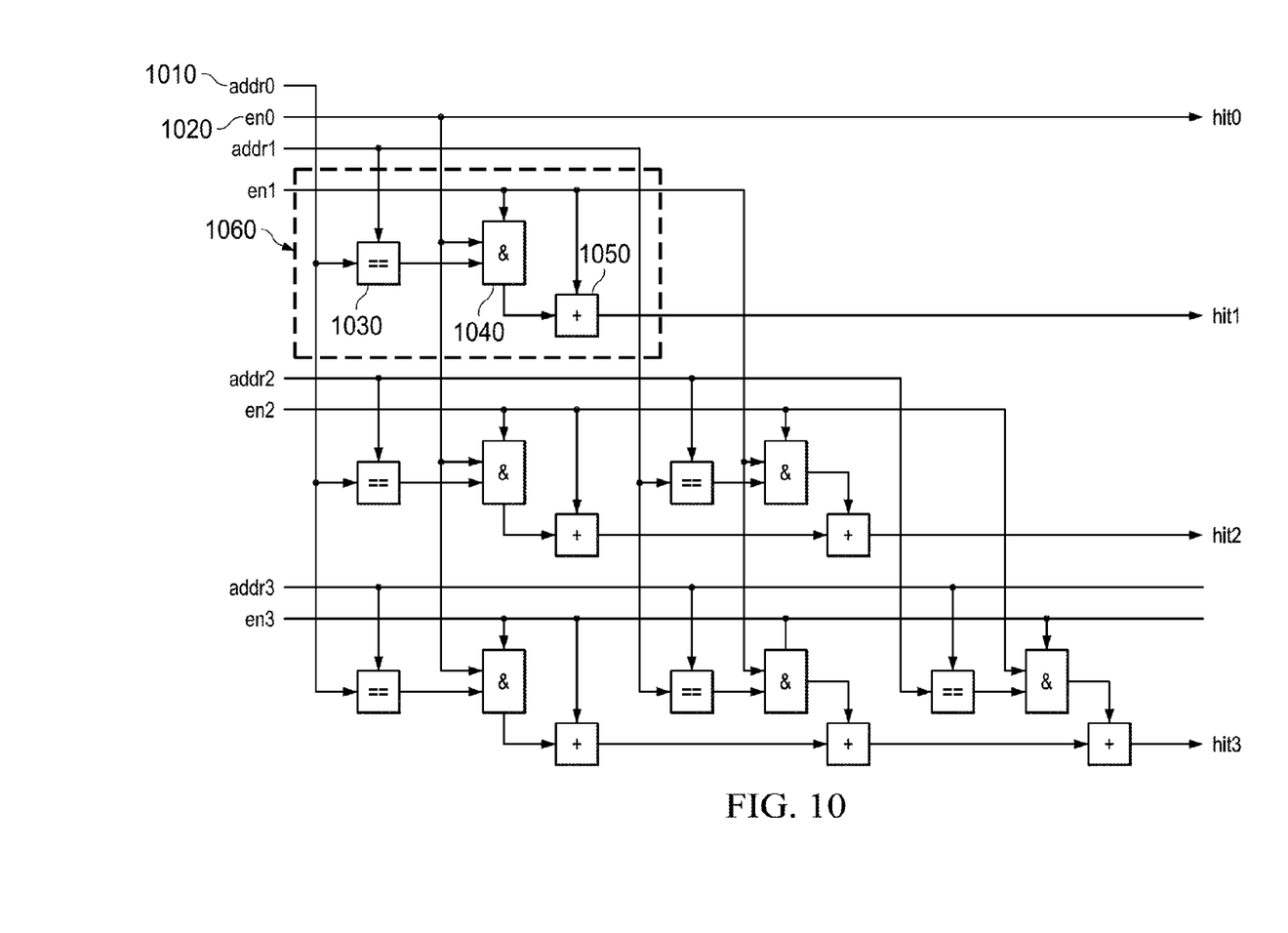
FIG. 10 is a block diagram of partial logic for providing a parallel atomic increment instruction.

FIG. 10 is a block diagram of a cascaded logic circuit disclosing an exemplary hardware implementation of the logic of the embodiment disclosed in FIGS. 7-9. The circuit is divided into a plurality of "levels," with each level handling logic for progressively higher-numbered PEs 112. Each PE 112 has associated with it an address 1010, which is the address of the memory location being read. For each PE 112 higher than PE0, a logic block 1060 is provided with a comparator 1030, an AND gate 1040, and an adder 1050. Logic block 1060 compares the index register of the PE being tested to the index register of a PE with a lower ordinal designation. If the index registers match and if the PE is enabled, the hit count is incremented by one, the adder is incremented by one. PE0 is a special case, because its count will always be exactly 1. Because each additional logic level includes one more logic block 1060 than the previous level, each logic block may have up to one "hit" more than the previous level.

Also disclosed in FIG. 10 is an "enable" operator 1020. Enable operator 1020 may be used to optionally select or de-select certain PEs 112 for inclusion in the "hit count." For example, any PE 112 with its enable operator set to "1" or "enabled" is included, while any PE 112 with its enable operator set to "0" or "disabled" is excluded from the count. Thus, for example, if enable operator 1020 for PE0-PE1, and PE3-PE7 are set to "1," while enable operator 1020 for PE2 is set to "0," PE2 will be ignored for purposes of the vector instructions provided herein.

The variation of the atomic increment operation disclosed in FIGS. 7-10 is useful in methods such as compressing arrays into lists. For example, in the Canny edge-detection filter, the only pixels that are interesting are ones that have a gradient magnitude above a threshold. All others are ignored. Thus, given a data set:

0 1 0 0-1 2 0 3

A Canny filter may be tasked with finding the offsets of all pixels that have a non-zero value. A parallelized operation can be implemented, for example:

```
for(i=j=0; i<N; i++)
    if(pixel[i])
        list[atomic_inc(&j)] = i;
```

The loop can be unrolled and executed for example on eight PEs, with each PE examining one pixel. The resulting list of non-zero pixels may be in the form:

4 5 7

In this case, the atomic increment disclosed in FIGS. 3-6 would be unsuitable because each PE would try to write its location back to the same position in the array "list[ ]." The embodiment of FIGS. 7-10 will work, however, because each PE will now receive a unique address.

With a serialized atomic increment instruction, this loop would be executed over eight sequential time divisions. But with a parallelized atomic increment, the entire loop can be executed in a single time division on eight PEs. The foregoing code can be further illustrated in the form of assembly instructions for an exemplary vector processor architecture.

```
vload pixel, p += NPE | |        # get pixels
vadd i, i, NPE          # get i in each PE
pred0 = pixel != 0      # set pred
vbroadcast jval, j ?pred0 | |    # get j value in every enabled PE
vgather_hit, inc, j ?pred0       # how many are enabled
vadd jval, jval, inc ?pred0      # incr index
vsub idx, jval, 1 ?pred0         # subtract 1 to get index
vscatter i, list, idx ?pred0 | | # write to list
vscatter jval, j, zero ?pred0    # update j
```

An exemplary histogram method is also provided. For example, a histogram may be coded in OpenCL as follows:

```
for (i=0; i<N; i++)
    atomic_inc (histogram + offset[i]);
```

The same method may be implemented in assembly instructions, with a similar vgather_hit instruction provided. Note that in this example, "vgather" and "vgather_hit" are provided as separate operations. In other embodiments, a single "vgather" instruction may return into designated registers both the value read and the hit count, as illustrated in FIGS. 3-9.

```
vload offset, p += NPE   # get address offsets
vgather h, histogram, offset | | # read current values
vgather_hit, histogram, offset # how many hit each addr
vadd h, h, hit           # incr value
vscatter h, histogram, offset # save in table
```

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with the described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. DSP 100 (FIG. 1) could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, DSP 100 may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in DSP 100 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A computer-executable method comprising:
   receiving a plurality of simultaneous read requests for a memory location;
   returning a value of the memory location and a value of a function of the number of simultaneous read requests;
   computing a sum of the value of the memory location and the number of read requests; and
   writing the sum back to the memory location.

2. The method of claim 1, wherein the plurality of simultaneous read requests are provided by a plurality of processing elements, each having an ordinal designation, and, wherein the returning comprises returning to each processing element the value of the memory location and the number of read requests by processing elements having an ordinal designation less than or equal to that of the processing element.

3. The method of claim 2, wherein the writing comprises each processing element attempting to write the sum back to the memory location and accepting the sum from the processing element with the highest ordinal designation.

4. The method of claim 1, wherein the plurality of simultaneous read requests are provided by a plurality of processing elements, and, wherein the returning comprises returning to each processing element the value of the memory location and the total number of read requests.

5. The method of claim 1, wherein computing a sum further comprises checking the status of an enable operator for each read request and including a read request in the sum only if the enable operator is in an enabled state.

6. A microprocessor comprising:
   a plurality of processing elements configured to simultaneously access a memory location;
   wherein the microprocessor is configured, upon receiving a plurality of read requests for the memory location, to return to at least one of the processing elements a value contained in the memory location and a value of a function of the number of processing elements that accessed the memory location.

7. The microprocessor of claim 6, wherein the microprocessor is further configured to return to each processing element providing a read request the value contained in the memory location.

8. The microprocessor of claim 7, wherein:
   each processing element is assigned an ordinal designation; and
   the function is, for a given processing element, the number of read requests by processing elements with an ordinal designation less than or equal to that of the processing element.

9. The microprocessor of claim 8, wherein the microprocessor is configured to provide the value of the function to each processing element providing a read request to the memory location.

10. The microprocessor of claim 9, wherein the microprocessor is further configured to receive a plurality of write requests from a plurality of processing elements to the memory location.

11. The microprocessor of claim 10, wherein the microprocessor is further configured to accept only the write request from the processing element having the highest ordinal designation.

12. The microprocessor of claim 6, wherein the microprocessor is further configured to return to each processing element that accesses the memory location the value of the function.

13. The microprocessor of claim 6, wherein the processor is further configured to return to each processing element that accesses the memory location the value contained in the memory location and the value of the function.

14. The microprocessor of claim 13, wherein the function is unity.

15. The microprocessor of claim 6, wherein the function is unity.

16. The microprocessor of claim 6, wherein each processing element has an associated enable operator, and, wherein the microprocessor is further configured to consider a processing element as having accessed the memory location only if the processing element's enable operator is in an enabled state.

17. A microprocessor providing a vector hit instruction, the vector hit instruction configured to:
   receive within a first time division and from a plurality of processing elements a plurality of read requests directed to a memory location; and
   on a second time division return to at least one of the processing elements a value that is a function of the number of processing elements that provided read requests for the memory location during the first time division.

18. The microprocessor of claim 17, wherein the vector hit instruction further provides to the at least one processing element a value of the memory location.

19. The microprocessor of claim 18 further providing a vector write instruction configured to:
   receive during a third time division and from the plurality of processing elements a plurality of write requests directed to the memory location; and
   selectively accept one of the write requests to write to the memory location.

20. The microprocessor of claim 19, wherein the microprocessor selectively accepts one of the write requests based on ordinal designations assigned to each processing element.

21. The microprocessor of claim 17, wherein the function is unity.

22. The microprocessor of claim 17, wherein each processing element is assigned an ordinal designation and, wherein the function is, for each processing element, the number of processing elements providing read requests with an ordinal designation less than or equal to that of the processing element.

23. The microprocessor of claim 17, wherein each processing element has an associated enable operator and, wherein the vector hit instruction is further configured to consider a processing element as having provided a read request only if the processing element's enable operator is enabled.

* * * * *